United States Patent [19]

Lawson et al.

[11] Patent Number: 5,460,226
[45] Date of Patent: Oct. 24, 1995

[54] FORMATION FRACTURING

[75] Inventors: Jimmie B. Lawson, Houston; Gerald C. Adams, Sugar Land; Robert J. Faircloth, Houston, all of Tex.

[73] Assignee: Shell Oil Company, Houston, Tex.

[21] Appl. No.: 245,730

[22] Filed: May 18, 1994

[51] Int. Cl.$^6$ ..................................................... E21B 43/26
[52] U.S. Cl. .................... 166/300; 166/308; 507/211; 507/267; 507/273; 507/903; 507/921; 507/922
[58] Field of Search .................................. 166/300, 308; 507/211, 267, 273, 903, 921, 922

[56] References Cited

U.S. PATENT DOCUMENTS

| | | | |
|---|---|---|---|
| 4,250,044 | 2/1981 | Hinkel | 166/308 X |
| 4,357,248 | 11/1982 | Berkshire et al. | 166/279 X |
| 4,560,486 | 12/1985 | Hinkel | 166/308 X |
| 4,619,776 | 10/1986 | Mondshine | 166/308 X |
| 5,067,566 | 11/1991 | Dawson | 166/308 |
| 5,106,518 | 4/1992 | Cooney et al. | 166/308 X |
| 5,165,479 | 11/1992 | Harris et al. | 166/300 |
| 5,201,370 | 4/1993 | Pin | 166/300 |
| 5,217,074 | 6/1993 | McDougall et al. | 166/300 |
| 5,223,159 | 6/1993 | Smith et al. | 166/308 X |
| 5,226,224 | 11/1993 | Sharill | 166/294 X |
| 5,226,481 | 7/1993 | Le et al. | 166/300 |
| 5,271,466 | 12/1993 | Harms | 166/300 |

*Primary Examiner*—George A. Suchfield
*Attorney, Agent, or Firm*—Del S. Christensen

[57] ABSTRACT

A method is provided to fracture a subterranean formation along with a fracturing fluid useful in this method, the method comprising the steps of: a) providing a fracturing fluid, the fracturing fluid is an aqueous solution having an initial pH greater than about 8 and comprising a polysaccharide, a source of borate in an amount that is effective to crosslink the polysaccharide at a pH greater than 8, an oxidative breaker, and a precursor that hydrolyzes in an amount that is effective to lower the pH of the fracturing fluid after a time period that is greater than about one half hour and less than about two days; b) injecting the fracturing fluid into the formation at a pressure the is effective to fracture the formation and force at least a portion of the fracturing fluid into the fracture; and c) permitting the precursor to hydrolyze and thereby lowering the pH of the fracturing fluid to a pH that is less than about 8.

11 Claims, No Drawings

FORMATION FRACTURING

FIELD OF THE INVENTION

The present invention relates to a method to fracture a subterranean formation and a fracturing fluid useful in that method.

BACKGROUND OF THE INVENTION

Oil and gas production wells are often fractured to improve recovery of oil and gas. Such fractures are typically provided by placing a fracturing fluid containing thickener and proppant in the wellbore and then applying a pressure that exceeds the fracture gradient of the formation. The proppants are held in suspension by a high viscosity imparted by the thickener. The fracturing fluid must have properties that prevent fluid loss to the formation in order to prevent the proppant from "sanding out" prior to the fracture reaching an effective size. The high viscosity of the fracturing fluid provide at least a portion of these fluid loss properties.

Polysaccharides are typically used as the polymer thickeners in fracturing fluids. Suitable polysaccharides include galactomannan gums, glucomannan gums, guars, derived guars and cellulose derivatives. Specific examples are guar gum, guar gum derivatives, locust bean gum, caraya gum, carboxymethyl cellulose, carboxymethyl hydroxyethyl cellulose and hydroxyethyl cellulose.

Polymeric thickeners can be made to be effective at lower concentrations by crosslinking the polymers. Polysaccharides can be crosslinked by metal ions such as aluminum, antimony, borate, zirconium and titanium containing compounds.

After a fracture is formed, and the proppant is in place, it is desirable to have the viscosity of the fracturing fluid quickly decrease so that production from the formation will not be inhibited by the thickened fracturing fluid. If the formation temperature is above about 200° F., the viscosity of the fracturing fluid will decrease because of thermal degradation of the polymer. At temperature less than 200° F., decreasing the viscosity of the fracturing fluid is often accomplished by including a "breaker" in the fracture fluid.

Breakers may be enzymes, oxidants or acids. These typical breakers begin reducing the solution's viscosity immediately, and the amount of polymer required to effectively thicken the fracturing fluid for the required time period is increased when a breaker is required. It would therefore be desirable to delay the viscosity reduction until after the polymer has served it's purpose. Effectively breaking polymers that have been used in fracturing fluids remains a problem, and in particular, effectively breaking polymers at temperatures below about 200° F. is a problem.

Borates are often used as crosslinking agents for polymeric thickeners. Borates are effective as crosslinking agents in basic solutions, and tend to disassociate from the polymers if the solution pH decreases below a pH of about 8. U.S. Pat. No. 5,271,466 discloses a process wherein this tendency to disassociate in acidic environments is utilized to break the polymer gel in a fracturing fluid by first injecting into the fracture a fracturing fluid crosslinked by a crosslinking agent that is effective in an acidic solution, and then injecting a borate crosslinked polymer gel in a basic solution. The two solutions then combine in the formation thereby lowering the pH to which the borate crosslinked polymer is exposed, and causing the borate crosslinks to disassociate. This process remains dependent upon thickened solutions mixing within a fracture, and is therefore less than totally effective.

U.S. Pat. No. 5,067,566 discloses a process wherein a borate crosslinked polymer is used in a fracturing fluid with an enzyme breaker and a pH regulating substance that slowly hydrolyzes to produce a Bronsted acid, thereby dropping the pH of the fracturing fluid. Enzyme breakers are not particularly effective in solutions having a pH above about 8, and the pH is lowered in the process of patent '566 to "activate" the enzyme breaker. Enzyme breakers are sensitive to many variables, and become denatured and inactive at temperatures above about 130° F. They are also relatively expensive.

It is therefore an object of the present invention to provide a method for fracturing a subterranean formation from a wellbore wherein a fracturing fluid is utilized that will, at temperatures between about 120° F. and about 200° F., effectively reduce in viscosity to a viscosity of 10 cp or less within a time period of less than about two days. It is a further object to provide a fracturing fluid useful in such a method.

SUMMARY OF THE INVENTION

These and other objects are accomplished by a method to fracture a subterranean formation and a fracturing fluid useful in this method, the method comprising the steps of:

a) providing a fracturing fluid, the fracturing fluid is an aqueous solution having an initial pH greater than about 8 and comprising a polysaccharide, a source of borate in an amount that is effective to crosslink the polysaccharide at a pH greater than 8, an oxidative breaker, and a precursor that hydrolyzes in an amount that is effective to lower the pH of the fracturing fluid after a time period that is greater than about one half hour and less than about two days;

b) injecting the fracturing fluid into the formation at a pressure that is effective to fracture the formation and force at least a portion of the fracturing fluid into the fracture; and c) permitting the precursor to hydrolyze and thereby lowering the pH of the fracturing fluid to a pH that is less than about 8.

The precursor of this invention is one of many well known precursors that hydrolyze over time forming acidic components that lower the pH of aqueous solutions of the precursors. After the pH of the fracturing fluid composition is lowered to a pH less than about 8, the borate crosslinking agent will begin to disassociate from the polysaccharide, and the viscosity of the fracturing fluid will decrease. The oxidative breakers of the present invention will then become much more effective in the less viscous fracturing fluid, and will then rapidly decrease the viscosity of the fracturing fluid to a viscosity of less than about 10 cp.

Preferred precursors of the present invention include formates such as ethylformate and acetates such as methylacetate and ethylacetate. Preferred oxidative breakers of the present invention include sodium persulfate, ammonium persulfate, sodium perborate, and ammonium perborate. Preferred sources of borates include boric acid, metaborates and tetraborates. Preferred polysaccharides include guar and hydroxypropyl guar.

DESCRIPTION OF THE INVENTION

Polysaccharides that are useful in the practice of the present invention include those that are known in the art to be useful as thickeners for fracturing fluids that can be crosslinked with borate type crosslinkers. Generally, polysaccharides that contain galactose, mannose, or both, are crosslinkable by borates. The polysaccharide is preferably selected from the group consisting of galactomannan gums, glucomannan gums, guars, and derived guars. These polysaccharides are well known and most are commercially available.

Generally, between about 20 and about 100 pounds of polysaccharides are used for each 1000 gallons of fracturing fluid.

The polysaccharide of the fracturing fluid of the present invention is crosslinked by a source of borate ions. Sources of borate ions include, for example, boric acid, borax, sodium borate hydrate, calciumborate salts, alkali metal borate decahydrate, and borate-glyoxal complexes described in U.S. Pat. No. 5,082,579, incorporated herein by reference. A commercially available borate source is "POLYBOR" available from U.S. Borax.

The source of borate may be a slightly soluble borate. Slowly soluble borates will are used to delay the onset of the crosslinking. Examples of slowly soluble borates included for example, probertite, ulexite, nobleite, gowerite, frolovite, colemanire, meyerhofferite, inyoite, priceire, tertschite, ginorite, pinnoire, paternoire, kurnakovite, inderite, perobrazhenskite, hydroboracite, inderborite, kaliborite, and veatchite.

The amount of the borate source present is preferably in the range of about one to about five pounds per 1000 gallons of fracturing fluid, and more preferably in the range of about one to about three pounds per 1000 gallons of fracturing fluid.

Boric acid is a very weak acid, and the borate ion does not exist as such until the pH is sufficiently high to react with more firmly bound second and third hydrogens. The borate ion complexes with many compounds, including the polysaccharides of the present invention, at a pH greater than about 8. At lower pHs, the borate is tied up by hydrogen ions and is not available for complexing and therefore is not an effective crosslinking agent.

The oxidative breaker of the present invention may be any one of those oxidative breakers known in the art to be useful to reduce the viscosity of polysaccharide-thickened compositions. Examples include ammonium and alkali persulfates, alkali metal hypochlorite, percarbonates and perborates. Persulfates are preferred. The amount of breaker required is strongly dependent upon the temperature of the formation to be fractured and the type of breaker, but will generally be within the range of about one fifth of a pound to about three pounds per 1000 gallons of fracturing fluid.

The precursor according to the present invention is a hydrolyzable precursor that forms an acidic component over time upon contact with water. Acceptable precursors include organic anhydrides, acyl halides, sulfonyl halides, benzylic halides and low molecular weight esters that hydrolyze with time to produce an acidic component. Preferred components include ethylacetate, 2-ethoxyethylacetate, ethylacetoacetate, triethylcitrate, methylbenzoate, ethylformate, methylacetate, and dimethylphthalate.

These precursors will hydrolyze when contacted with water to form alcohols and acids. The amount of the precursor preferred in the fracturing fluid of the present invention is between about one quarter of a percent and about two percent by weight of the fracturing fluid.

The fracturing fluid of the present invention may also contain other components and additives known to be useful in fracturing fluids. For example, fracturing fluids typically contain proppants, clay stabilizers, surfactants, and fluid loss control additives. They may also contain oxygen scavengers, alcohols or foaming agents.

In order to fracture a subterranean formation according to the present invention, an aqueous fracturing fluid is prepared by blending the polymeric thickening agent into an aqueous fluid. The aqueous fluid could be, for example, fresh water, brine, sea water, or alcohol-water mixtures. When divalent cation containing brines or sea waters are used, a chelating agent may preferably be included to prevent the divalent cations from interfering with the hydration and crosslinking of the polymers.

The source of borate, the breaker, the precursor, proppants and other additives are then added to the thickened fluid. The thickened fluid is placed in the wellbore, and then the pressure on the fluid is then increased to a pressure that exceeds the formation fracturing pressure. The formation is thereby fractured and the fracturing fluid is forced into the fractures. The source of the borate, the breaker, and the precursor are preferably added to the fracturing fluid within a short time period before the fracturing fluid in injected into the formation to minimize premature crosslinking, degradation of the polymer, and hydrolysis of the precursor.

The initial pH of the fracturing fluid is above 8, and can be adjusted to this level by addition of sodium hydroxide or another known base. The initial pH is the pH of the fracturing fluid at the time the fluid in injected into the formation. This pH will then decrease upon hydrolysis of the precursor, resulting in the removal of the borate crosslinks between polysaccharide molecules.

EXAMPLES

Five samples of borate-crosslinked gels were prepared with guar polymer to demonstrate the effectiveness of the method of the present invention. Each of the samples contained thirty pounds of guar polymer per thousand gallons of solution. Two types of borate crosslinkers were used. Type A crosslinker was 1.2 pounds of boric acid per 1000 gal of guar solution with sodium hydroxide added to raise the pH of the solution to 11. Type B crosslinker was a mixture of Schlumberger-Dowell products that included 20 pounds of J480, 12 pounds of M2 and 5 pounds of L10, all in seven gallons of water. About one pound of the crosslinker mixture per 1000 gal of guar solution was used when the Type B crosslinker was used.

Ethylacetate ("ETAC") and ammoniumpersulfate ("AP") were used in various combinations as breakers.

The table below summarizes the results of the five samples.

TABLE

| Sample No. | 1 | | 2 | | 3 | | 4 | | 5 | |
|---|---|---|---|---|---|---|---|---|---|---|
| Crosslinker Type | A | | A | | A | | B | | B | |
| AP % wt | 0.2 | | 0. | | 0.2 | | 0.2 | | 0.2 | |
| ETAC % wt | 0. | | 0.05 | | 0.05 | | 0. | | 0.05 | |

| TIME-Hours | Vis. | pH | Vis. | pH | Vis. | pH | Vis. | pH | Vis. | pH |
|---|---|---|---|---|---|---|---|---|---|---|
| 0 | CL | 11 | CL | 11 | CL | 11 | CL | 11 | CL | 11 |
| 0.5 | CL | 11 | CL | 8.7 | CL | 8.6 | CL | 11 | 18 | — |
| 1 | CL | 11 | PCL | 8.3 | 31.5 | 8.1 | 9 | 11 | 15 | — |
| 2 | CL | 11 | 27 | 7.9 | — | — | — | — | — | — |
| 3 | CL | 11 | 2.7 | 7.7 | — | — | — | — | — | — |
| 4 | — | — | — | — | — | 6 | 11 | 9 | — | — |
| 24 | — | — | — | — | 9. | 6.8 | — | — | — | — |

In the table, CL under the viscosity heading indicates that the guar is crosslinked, and PCL means that the guar is partially crosslinked. The times listed in the table are the lapse times from when the breakers were mixed with the crosslinked polymers. The samples were held at 170° F. for the duration of the viscosity and pH measurements. The viscosities listed in the table are in centipoise measured at a temperature of 170° F. and a shear rate of 170 sec$^{-1}$. It was also observed that when ethylacetate was incorporated in the mixtures, the solutions had less insoluble residue after the polymers were broken.

The results contained in the table demonstrate that ethyl acetate reduces solution pH and hastens degradation of viscosity.

The foregoing examples are exemplary of the present invention and reference to the following claims is made to determine the scope of the present invention.

We claim:

1. A method to fracture a subterranean formation comprising the steps of:
   a) providing a fracturing fluid, the fracturing fluid being an aqueous solution having an initial pH greater than about 8 and comprising a polysaccharide, a source of borate in an amount that is effective to crosslink the polysaccharide at a pH greater than 8, an oxidative breaker, and a precursor that hydrolyzes in an amount that is effective to lower the pH of the fracturing fluid after a time period that is greater than about one half hour and less than about two days;
   b) injecting the fracturing fluid into the formation at a pressure that is effective to fracture the formation and force at least a portion of the fracturing fluid into the fracture; and
   c) permitting the precursor to hydrolyze and thereby lowering the pH of the fracturing fluid to a pH that is less than about 8.

2. The method of claim 1 wherein the polysaccharide is selected from the group consisting of galactomannan gums, glucomannan gums, guars, and derived guars.

3. The method of claim 1 wherein the oxidative breaker is selected from the group consisting of persulfates, and perborates.

4. The method of claim 1 wherein the oxidative breaker is selected from the group consisting of ammonium persulfate, alkali persulfates, alkali metal hypochlorite, and percarbonates.

5. The method of claim 1 wherein the precursor is selected from the group consisting of organic esters.

6. The method of claim 1 wherein the source of borate is selected from the group consisting of boric acid, metaborates, and tetraborates.

7. The method of claim 1 wherein the fracturing fluid has an initial viscosity of greater than about 500 cp as measured by Couette viscometry and after a time period of between about one half of an hour and about two days, has a viscosity of less than about ten cp as measured by Couette viscometry.

8. The method of claim 2 wherein the oxidative breaker is selected from the group consisting of ammonium persulfate, alkali persulfates, alkali metal hypochlorite, and percarbonates.

9. The method of claim 8 wherein the precursor is selected from the group consisting of organic esters.

10. The method of claim 9 wherein the source of borate is selected from the group consisting of boric acid, metaborates, and tetraborates.

11. A method to fracture a subterranean formation comprising the steps of:
   a) providing a fracturing fluid, the fracturing fluid being an aqueous solution having an initial pH greater than about 8 and comprising a polysaccharide, a source of borate in an amount that is effective to crosslink the polysaccharide at a pH of greater than 8, an oxidative breaker, and a precursor that hydrolyses in an amount that is effective to lower the pH of the fracturing fluid after a time period that is greater than about one half hour and less than about two days, wherein the precursor is selected from the group comprising ethylacetate, 2-ethoxyethyl acetate, ethyl acetoacetate, methylbenzoate, ethylformate, methylacetate, and dimethylphthalate;
   b) injecting the fracturing fluid into the formation at a pressure that is effective to fracture the formation and force at least a portion of the fracturing fluid into the fracture; and
   c) permitting the precursor to hydrolyze and thereby lowering the pH of the fracturing fluid to a pH that is less than about 8.

\* \* \* \* \*